US012798514B2

(12) United States Patent
Matsumoto

(10) Patent No.: US 12,798,514 B2
(45) Date of Patent: Nov. 17, 2026

(54) DOOR LOCK SYSTEM

(71) Applicant: SUBARU CORPORATION, Tokyo (JP)

(72) Inventor: Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/184,808

(22) Filed: Apr. 21, 2025

(65) Prior Publication Data

US 2025/0353461 A1 Nov. 20, 2025

(30) Foreign Application Priority Data

May 17, 2024 (JP) ................................ 2024-080815

(51) Int. Cl.
*B60R 25/34* (2013.01)
*B60R 25/01* (2013.01)
*B60R 25/24* (2013.01)

(52) U.S. Cl.
CPC .............. *B60R 25/01* (2013.01); *B60R 25/24* (2013.01); *B60R 25/34* (2013.01)

(58) Field of Classification Search
CPC .......... B60R 25/01; B60R 25/24; B60R 25/34
See application file for complete search history.

(56) References Cited

U.S. PATENT DOCUMENTS

2004/0168371 A1* 9/2004 Engelgau .............. E05F 15/603
49/360
2005/0099263 A1* 5/2005 Ikeda ...................... E05B 77/48
340/426.36
2015/0161831 A1* 6/2015 Shon ........................ G07C 9/20
340/5.61

FOREIGN PATENT DOCUMENTS

JP 2006-062622 A 3/2006
JP 2022052906 A * 4/2022

* cited by examiner

*Primary Examiner* — Nay Tun
(74) *Attorney, Agent, or Firm* — Rimon P.C.

(57) ABSTRACT

A door lock system is configured to lock or unlock a door of a vehicle by controlling a door lock mechanism of the door. The door lock system includes one or more processors. The one or more processors are configured to control, based on a lock instruction signal or an unlock instruction signal for the door lock mechanism, the door lock mechanism and control a window of the vehicle. The one or more processors are configured to, when the one or more processors receive an input of the lock instruction signal in a parked state or a stopped state of the vehicle, lock the door by controlling the door lock mechanism and prohibit an opening operation and a closing operation of the window.

7 Claims, 2 Drawing Sheets

DOOR LOCK SYSTEM

CROSS-REFERENCE TO RELATED APPLICATIONS

The present application claims priority from Japanese Patent Application No. 2024-080815 filed on May 17, 2024, the entire contents of which are hereby incorporated by reference.

BACKGROUND

The disclosure relates to a door lock system configured to control locking or unlocking of a door of a vehicle by controlling a door lock mechanism of the door and control an opening and closing operation of a window mechanism.

In recent years, a technique has been known in which a wireless communication is performed between a processor such as an electronic control unit (ECU) or a body control module (BCM) mounted on a vehicle and a portable device, and locking and unlocking of doors of the vehicle are performed based on a signal transmitted from the portable device on condition that authentication is established. Examples of the portable device may include a small communicator usable as an electronic key or a digital key. For example, reference is made to Japanese Unexamined Patent Application Publication (JP-A) No 2006-62622.

SUMMARY

An aspect of the disclosure provides a door lock system configured to lock or unlock a door of a vehicle by controlling a door lock mechanism of the door. The door lock system includes one or more processors. The one or more processors are configured to control, based on a lock instruction signal or an unlock instruction signal for the door lock mechanism, the door lock mechanism and control a window of the vehicle. The one or more processors are configured to, when the one or more processors receive an input of the lock instruction signal in a parked state or a stopped state of the vehicle, lock the door by controlling the door lock mechanism and prohibit an opening operation and a closing operation of the window.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
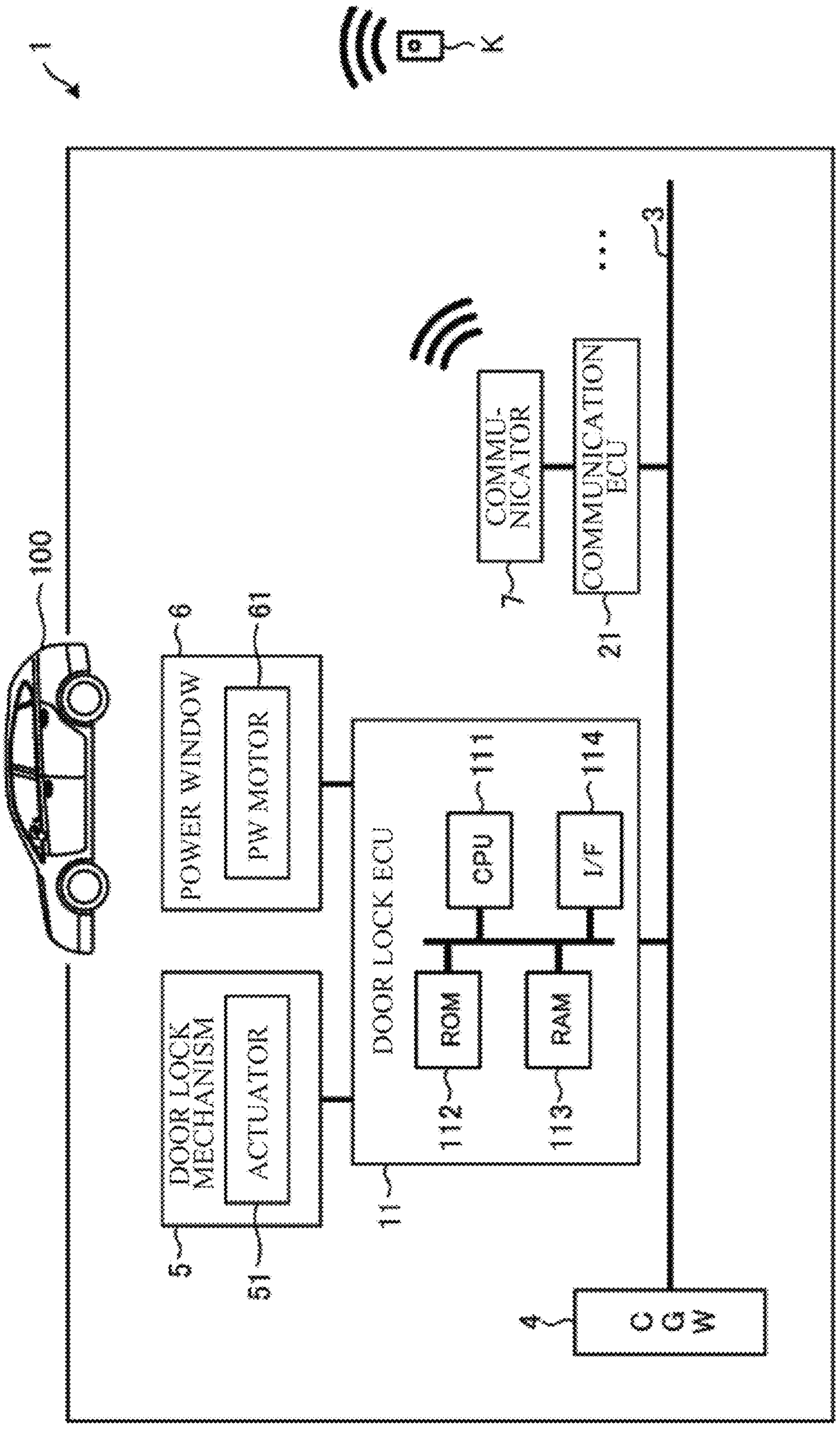
FIG. 1 is an explanatory diagram illustrating a schematic configuration of a door lock system according to one example embodiment of the disclosure.

A vehicle equipped with a technique described above, such as that disclosed in JP-A No 2006-62622, includes a plurality of antennas inside and outside the vehicle, and whether the portable device is located inside or outside the vehicle is determined based on the antennas. When the portable device is determined as being located inside the vehicle, the locking is not performed even if a signal directed to perform the locking is transmitted from the portable device to thereby prevent an event so-called in-lock or in-key.

The in-lock, however, can occur due to various reasons, such as when: a battery of the portable device is exhausted; a signal from the portable device is not normally received; the portable device is erroneously determined as being located outside a vehicle; or the portable device is located near a boundary between inside and outside of the vehicle, such as at a position inside the vehicle close to a window of the vehicle.

When the in-lock occurs, it is difficult to unlock doors unless there is a spare portable device, raising a concern that it takes time and expense to unlock the doors. For example, it is necessary to request a rescue service to unlock the doors.

Accordingly, what is desired is to prevent the in-lock due to various reasons including the in-lock due to expectable reasons such as those described above, as well as a mischief and an unexpectable reason.

It is desirable to provide a door lock system that makes it possible to prevent an in-lock due to an unexpected reason while suppressing an increase in cost due to addition of a component such as a sensor or an antenna.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Referring to FIG. 1, a door lock system according to an example embodiment may serve as a part of a vehicle control system 1 to be mounted on a vehicle 100. The door lock system is configured to control locking or unlocking of a door of the vehicle 100 by controlling a door lock mechanism 5 of the door and control opening and closing of a power window 6.

The vehicle control system 1 may include: a plurality of sensors configured to acquire various types of data indicating a traveling state of the vehicle 100 and an environment inside and outside the vehicle 100; various electronic devices for traveling of the vehicle 100; and a plurality of electronic control units (ECUs) configured to control the sensors and the electronic devices. With such a configuration, the vehicle control system 1 may be configured to perform various controls necessary for achieving and maintaining safe traveling of the vehicle 100 and a convenience and a comfort of an occupant.

Each sensor, each electronic device, and each ECU may be communicably coupled to each other by an in-vehicle network 3 and a central gateway (CGW) 4. The in-vehicle network 3 may be any network such as a controller area network (CAN) or a local interconnect network (LIN). The CGW 4 may serve as a relay device. It is to be noted that the vehicle control system 1 illustrated in FIG. 1 is exemplary.

In some embodiments, the CGW 4 may not be provided, and the ECUs may directly or indirectly communicate with each other.

In the vehicle control system 1, data acquired by each sensor may be outputted to the in-vehicle network 3 and data indicating an operation state of an electronic device to be controlled (hereinafter referred to as a "control target device") may be outputted from each ECU to the in-vehicle network 3. Each ECU may be configured to control an operation of the control target device, based on the data from each sensor and another ECU acquired from the in-vehicle network 3.

Each ECU may include one or more processors and execute various processes by the one or more processors. Non-limiting examples of the one or more processors may include a central processing unit (CPU) and a micro processing unit (MPU). Each ECU may include a volatile storage device such as a random-access memory (RAM) that temporarily processes data to be used by the one or more processors, and a non-volatile storage device such as a read-only memory (ROM) that stores, for example, a program to be executed by a device such as the one or more processors.

FIG. 1 illustrates a door lock ECU 11 and a communication ECU 21 configured to control a communicator 7 among the plurality of ECUs. In one embodiment, the door lock ECU 11 may serve as a "door lock system". The communicator 7 may be configured to perform communication with an external device of the vehicle 100. The illustration of any other ECU is omitted in FIG. 1. In the present example embodiment, detailed explanation and illustration of an ECU, a sensor, and an electronic device that are not involved in a configuration and an operation of the door lock ECU 11 are omitted even if they are included in the vehicle control system 1.

Hereinafter, the door lock ECU 11 and the communication ECU 21 illustrated in FIG. 1 will be described.

The door lock ECU 11 may be coupled to an actuator 51 of the door lock mechanism 5. The door lock ECU 11 may be configured to lock or unlock the door provided with the door lock mechanism 5 by controlling the driving of the actuator 51.

For example, the door lock ECU 11 may be configured to control the door lock mechanism 5, based on a lock instruction signal or an unlock instruction signal that is based on an operation performed on a switch provided inside a vehicle compartment of the vehicle 100. Thus, the door lock ECU 11 may be configured to drive the actuator 51 and thereby lock or unlock the door. In an alternative example, the door lock ECU 11 may be configured to control the door lock mechanism 5, based on a lock instruction signal or an unlock instruction signal that is based on a signal emitted from a portable device K. Thus, the door lock ECU 11 may be configured to drive the actuator 51 and thereby lock or unlock the door. Note that the door lock ECU 11 may control, for each door, the door lock mechanism 5 of each of the doors of the vehicle 100.

The door lock ECU 11 may be coupled to a PW motor 61 of the power window 6. The door lock ECU 11 may be configured to open and close the power window 6 by controlling the driving of the PW motor 61.

For example, the door lock ECU 11 may be configured to drive the PW motor 61, based on an opening instruction signal or a closing instruction signal that is based on an operation performed on a switch provided inside the vehicle compartment of the vehicle 100. Thus, the door lock ECU 11 may be configured to control the opening and closing of the power window 6. In an alternative example, the door lock ECU 11 may be configured to drive the PW motor 61, based on an opening instruction signal or a closing instruction signal that is based on a signal emitted from the portable device K. Thus, the door lock ECU 11 may be configured to control the opening and closing of the power window 6.

As will be described later, the door lock ECU 11 is configured to control the opening and the closing of the power window 6 when the door lock ECU 11 has locked the door in accordance with the lock instruction signal for the door lock mechanism 5. Note that the door lock ECU 11 may control, for each door, the power window 6 of each of the doors of the vehicle 100.

The portable device K may be a portable and small communication device configured to perform a distance measurement and positioning by a short-range wireless communication. Non-limiting examples of the short-range wireless communication may include an ultra-wideband (UWB), a Bluetooth (registered trademark), and a Bluetooth long energy (BLE). Non-limiting examples of the portable device K may include a general-purpose communicator such as a smartphone or a smart watch. Installing a predetermined application in the portable device K in advance may allow the portable device K to serve as a so-called digital key. In one example, a dedicated electronic key configured to communicate with the vehicle 100 may be used as the portable device K.

As illustrated in FIG. 1, the door lock ECU 11 may include a central processing unit (CPU) 111, a read-only memory (ROM) 112, a random-access memory (RAM) 113, and an interface (I/F) 114. The door lock ECU 11 is configured to control the door lock mechanism 5 and the power window 6 by causing the CPU 111 to execute various processes that are based on the program stored in ROM 112.

In one embodiment, the CPU 111 may serve as "one or more processors".

The ROM 112 may be provided as a non-volatile storage device. The ROM 112 may store: a control program designed to authenticate the portable device K and control the door lock mechanism 5; and various types of data for execution of the program. The various types of data may include unique ID data, or vehicle ID, for identification of the vehicle 100, or the door lock ECU 11. The various types of data may also include ID data, or device ID, for identification of the portable device K and may be used for authentication of the portable device K.

The RAM 113 may be provided as a volatile storage device. The RAM 113 may be used as a working area when the CPU 111 executes various processes. Various types of data outputted from each ECU and each sensor on the in-vehicle network 3 may be temporarily stored in the RAM 113 on an as-necessary basis.

The CPU 111 may be configured to control, based on the signal received from the portable device K, the door lock mechanism 5 by loading the program stored in the ROM 112 into a memory such as the RAM 113 and executing the program.

The I/F 114 may be configured to control an input and an output of various types of data and a control signal to be used by the door lock ECU 11. The I/F 114 may be configured to receive the input of various types of data outputted, to the in-vehicle network 3, from each ECU and each sensor of the vehicle control system 1, and output the control signal generated by the CPU 111 to an output destination that corresponds to a control content.

For example, the I/F 114 may be configured to receive the lock instruction signal or the unlock instruction signal from the in-vehicle network 3. In one example, the I/F 114 may be configured to receive the lock instruction signal or the unlock instruction signal transmitted from the portable device K via the communication ECU 21 and the in-vehicle network 3. In another example, the I/F 114 may be configured to receive, via an unillustrated ECU that controls a switch provided inside the vehicle compartment and via the in-vehicle network 3, the lock instruction signal or the unlock instruction signal that is based on an operation performed on the switch.

The door lock ECU 11 may perform the authentication of the portable device K that is a source of the lock instruction signal or the unlock instruction signal with respect to the vehicle 100, when the door lock ECU 11 has received the lock instruction signal or the unlock instruction signal transmitted from the portable device K. Accordingly, upon the authentication, the I/F 114 may be configured to output, to the in-vehicle network 3, a signal that includes the vehicle ID and that is to be transmitted from the communicator 7 to the portable device K, when the I/F 114 has received an input of the signal that is emitted from the portable device K and received by the communicator 7.

In some embodiments, the I/F 114 may be configured to perform a wireless communication, and may directly transmit and receive the signal between the door lock ECU 11 and the portable device K. The I/F 114 may be configured to output, to the door lock mechanism 5, a control signal that drives the actuator 51 when the door provided with the door lock mechanism 5 is to be locked or unlocked. The I/F 114 may be configured to output, to the power window 6, a control signal that drives the PW motor 61 when the power window 6 is to be opened or closed.

The communication ECU 21 may be coupled to the communicator 7, and configured to control transmission and reception of a signal of the communicator 7. The communicator 7 may include an unillustrated transmission antenna and an unillustrated reception antenna. The communicator 7 may be configured to transmit a predetermined signal to the portable device K and receive the signal emitted from the portable device K.

The communication ECU 21 may be configured to receive the signal that includes the vehicle ID and that is transmitted from the portable device K via the communicator 7, and output the signal to the door lock ECU 11 via the communication ECU 21, upon the authentication of the portable device K by the door lock ECU 11. The communication ECU 21 may be configured to receive, from the door lock ECU 11, data that includes the vehicle ID and that is necessary for the authentication, and cause the communicator 7 to transmit a signal that includes the data to the portable device K.

Figure 2:
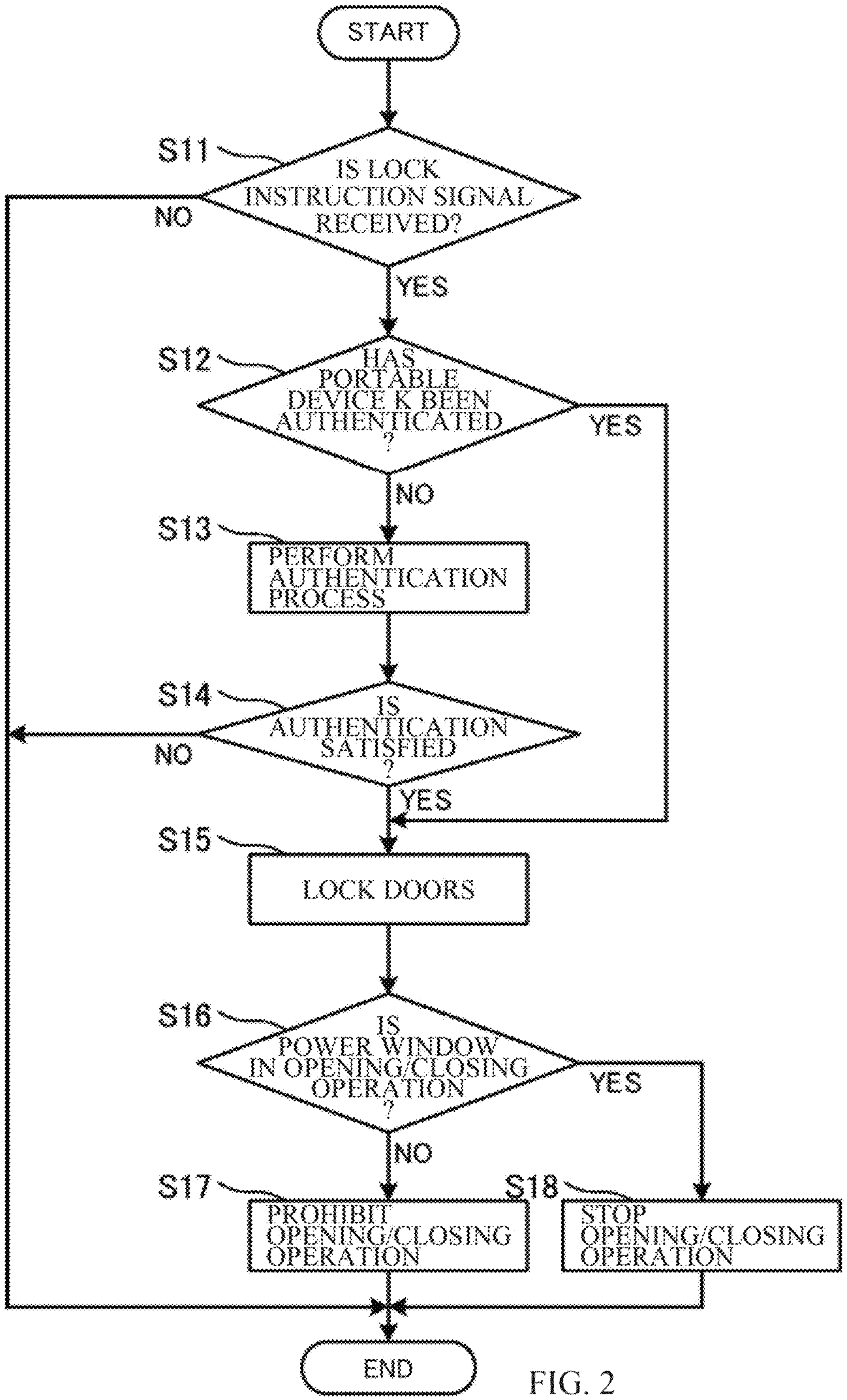
FIG. 2 is a flowchart illustrating an example of a control process to be performed by the door lock system illustrated in FIG. 1.

Hereinafter, an example of a process of controlling the door lock mechanism 5 and the power window 6 to be performed by the door lock ECU 11 configured as described above will be described with reference to a flowchart illustrated in FIG. 2. The flowchart illustrated in FIG. 2 illustrates an example process to be performed when the vehicle 100 is in a parked state or a stopped state. A series of processes from “START” to “END” may be repeatedly performed at a predetermined cycle or a time interval from when the vehicle 100 is parked or stopped until when an engine is stopped or an ignition switch is turned off such that the vehicle 100 enters a sleep state.

The door lock ECU 11 may confirm whether the I/F 114 has received the lock instruction signal via the communication ECU 21 (step S11). If the lock instruction signal is received (step S11: YES) the door lock ECU 11 may confirm, if the received lock instruction signal is received from the portable device K, whether the portable device K has been authenticated, or whether an authentication process has already been completed (step S12).

If the portable device K has been authenticated (step S12: YES), the door lock ECU 11 may lock, based on the lock instruction signal, the doors of the vehicle 100 by driving the actuators 51 of the respective door lock mechanisms 5 (step S15). If the portable device K has not been authenticated (step S12: NO), the door lock ECU 11 may perform the authentication process (step S13). After a predetermined period of time has elapsed, the door lock ECU 11 may confirm whether the portable device K is authenticated by the authentication process (step S14).

If the door lock ECU 11 has confirmed that the portable device K is authenticated (step S14: YES), the door lock ECU 11 may lock, based on the lock instruction signal, the doors of the vehicle 100 by driving the actuators 51 of the respective door lock mechanisms 5 (step S15). If the portable device K is not authenticated even after the predetermined period of time has elapsed (S14: NO), the door lock ECU 11 may end the process without locking the doors. In step S11, if the lock instruction signal received by the I/F 114 is based on the operation performed on the switch inside the vehicle compartment, the door lock ECU 11 may cause the process to proceed from step S12 to step S15 without performing the process of step S14, and may lock the doors of the vehicle 100 by driving the actuators 51 of the respective door lock mechanisms 5 (step S15).

After the doors are locked (step S15), the door lock ECU 11 may confirm whether the power window 6 is in an opening operation or a closing operation (step S16). In other words, the door lock ECU 11 may confirm whether the PW motor 61 is being driven. If the power window 6 is not in the opening operation or the closing operation (step S16: NO), the door lock ECU 11 may prohibit the subsequent opening operation or the subsequent closing operation regardless of an opening state or a closing state of the power window 6 (step S17), and may end the process.

Thus, the door lock ECU 11 does not drive the PW motor 61 and does not open or close the power window 6 even when the door lock ECU 11 has received the opening instruction signal or the closing instruction signal of the power window 6. If the power window 6 is in the opening operation or the closing operation, the door lock ECU 11 may stop the driving of the PW motor 61 and stop the opening operation or the closing operation of the power window 6, regardless of whether the operation of the power window 6 is in an opening direction or in a closing direction (step S18), and may end the process.

According to the example embodiment, when the input of the lock instruction signal for the door lock mechanism 5 is received in the parked state or the stopped state of the vehicle 100, the doors are locked and the opening operation or the closing operation of the power window 6 is prohibited. In some embodiments, when the input of the lock instruction signal for the door lock mechanism 5 is received in the parked state or the stopped state of the vehicle 100, the doors are locked and the opening operation or the closing operation may be stopped. Accordingly, for example, these configurations each make it possible to maintain the opening state of the power window 6 when the power window 6 is opened.

Incidentally, when the engine is stopped or the ignition switch is turned off, the vehicle 100 can be placed into the sleep state after a predetermined period of time has elapsed. In this case, electric power for the driving of the PW motor 61 is no longer supplied, making it difficult to perform the opening operation or the closing operation of the power window 6.

However, even after the engine is stopped or the ignition switch is turned off, it is possible to perform, before the sleep state is satisfied, the opening operation or the closing operation of the power window 6 based on the opening instruction signal or the closing instruction signal for the power window 6.

For example, in the vehicle 100, the power window 6 operates in the closing direction when: the engine is stopped or the ignition switch is turned off with the power window 6 being opened; and the closing operation is performed on the power window 6 before the vehicle 100 enters the sleep state. During the operation of the power window 6 in the closing direction, the portable device K can be thrown into the vehicle 100 due to interest or mischief, or the portable device K can be accidentally dropped into the vehicle 100. In this case, the "in-lock" occurs when the doors are locked.

In contrast, in the example embodiment, the opening operation or the closing operation of the power window 6 is prohibited or stopped when the doors are locked with the power window 6 being opened. Accordingly, a state in which the power window 6 is opened is maintained, preventing the occurrence of the "in-lock".

The example embodiment of the disclosure thus helps to prevent the in-lock caused by an unexpected reason such as the mischief, the interest, or carelessness without adding a component such as a sensor or an antenna. Accordingly, the example embodiment of the disclosure helps to prevent the in-lock due to an unexpected reason while suppressing an increase in cost due to addition of a component such as a sensor or an antenna.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The techniques according to the example embodiments and their modification examples described above may be combined with each other in any combination unless any contradiction occurs in terms of their purposes, configurations, etc.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The door lock system according to at least one embodiment of the disclosure makes it possible to prevent an in-lock due to an unexpected reason while suppressing an increase in cost due to addition of a component such as a sensor or an antenna.

The CPU 111 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 111. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 111 illustrated in FIG. 1.

The invention claimed is:

1. A door lock system configured to lock or unlock a door of a vehicle by controlling a door lock mechanism of the door, the door lock system comprising:

one or more processors configured to control, based on a lock instruction signal or an unlock instruction signal for the door lock mechanism, the door lock mechanism and control a window of the vehicle, wherein the one or more processors are configured to, when the window is in an open state and the one or more processors receive an input of the lock instruction signal in a parked state or a stopped state of the vehicle, lock the door by controlling the door lock mechanism and prohibit an opening operation and a closing operation of the window without closing the window, so that a state in which the window is opened is maintained.

2. The door lock system according to claim 1, wherein the one or more processors are configured to, when the one or more processors receive the input of the lock instruction signal while the window is undergoing the opening operation or the closing operation in the parked state or the stopped state of the vehicle, lock the door by controlling the door lock mechanism and stop the opening operation or the closing operation of the window without closing the window, wherein the stopped opening operation or closing operation is not subsequently resumed, thereby maintaining the window in the open state.

3. The door lock system according to claim 2, wherein the one or more processors are configured to stop the opening operation or the closing operation of the window after an engine is stopped or an ignition switch is turned off and before the vehicle enters a sleep state.

4. The door lock system according to claim 1, wherein the lock instruction signal is based on a signal emitted from a portable device.

5. The door lock system according to claim 4, wherein the one or more processors are configured to authenticate the portable device and lock the door when the portable device is authenticated.

6. The door lock system according to claim 1, wherein the one or more processors are configured to confirm whether a motor of the window is being driven after locking the door.

7. The door lock system according to claim 1, wherein the one or more processors are configured not to drive a motor of the window after locking the door even when the one or more processors receive an opening instruction signal or a closing instruction signal for the window.

* * * * *